US010089065B2

(12) United States Patent
Kuper

(10) Patent No.: US 10,089,065 B2
(45) Date of Patent: *Oct. 2, 2018

(54) MUSIC STREAMING USING SUPPORTED SERVICES

(71) Applicant: Sonos, Inc., Santa Barbara, CA (US)

(72) Inventor: Ron Kuper, Arlington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,097

(22) Filed: Apr. 4, 2017

(65) Prior Publication Data

US 2017/0206058 A1 Jul. 20, 2017

Related U.S. Application Data

(63) Continuation of application No. 14/318,148, filed on Jun. 27, 2014, now Pat. No. 9,646,085.

(51) Int. Cl.
*G06F 17/00* (2006.01)
*G06F 3/16* (2006.01)
*G06F 17/30* (2006.01)

(52) U.S. Cl.
CPC .......... *G06F 3/165* (2013.01); *G06F 17/3074* (2013.01); *G06F 17/30772* (2013.01); *G06F 17/30778* (2013.01)

(58) Field of Classification Search
CPC ...................................................... G06F 3/165
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |

(Continued)

FOREIGN PATENT DOCUMENTS

| EP | 1389853 A1 | 2/2004 |
| KR | 100890993 | 3/2009 |

(Continued)

OTHER PUBLICATIONS

AudioTron Quick Start Guide, Version 1.0, Mar. 2001, 24 pages.

(Continued)

*Primary Examiner* — Joseph Saunders, Jr.
(74) *Attorney, Agent, or Firm* — McDonnell Boehnen Hulbert & Berghoff LLP

(57) ABSTRACT

An example technique includes a computing system storing media item identifiers of curated media items associated with one or more service providers. A media curating service aggregates the media item identifiers of curated media items. The example technique further involves receiving, from a media playback system, a first message comprising a service provider access identifier. The service provider access identifier is based on a user account of the media playback system registered to at least one service provider. Based on receiving the first message, the computing system determines media item identifiers of curated media items that are associated with the at least one service provider with which the user account of the media playback system is registered and causes the media playback system to play back the curated media items based on the determined media item identifiers of the curated media items.

20 Claims, 8 Drawing Sheets

(56) References Cited

U.S. PATENT DOCUMENTS

| | | |
|---|---|---|
| 6,108,686 A | 8/2000 | Williams, Jr. |
| 6,256,554 B1 | 7/2001 | DiLorenzo |
| 6,349,339 B1 | 2/2002 | Williams |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 7,987,294 B2 | 7/2011 | Bryce et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,103,009 B2 | 1/2012 | McCarty et al. |
| 8,214,873 B2 | 7/2012 | Weel |
| 8,230,099 B2 | 7/2012 | Weel |
| 8,234,395 B2 | 7/2012 | Millington et al. |
| 8,483,853 B1 | 7/2013 | Lambourne |
| 8,942,252 B2 | 1/2015 | Balassanian et al. |
| 9,286,384 B2 | 3/2016 | Kuper et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0088328 A1 | 5/2004 | Cook et al. |
| 2006/0253436 A1 | 11/2006 | Cook et al. |
| 2007/0088747 A1 | 4/2007 | Cheng et al. |
| 2007/0142944 A1 | 6/2007 | Goldberg et al. |
| 2007/0294131 A1 | 12/2007 | Roman et al. |
| 2008/0052371 A1 | 2/2008 | Partovi et al. |
| 2009/0307062 A1 | 12/2009 | Lutnick et al. |
| 2010/0017366 A1 | 1/2010 | Robertson et al. |
| 2010/0075313 A1 | 3/2010 | Kreuwel et al. |
| 2010/0205222 A1 | 8/2010 | Gajdos et al. |
| 2010/0262909 A1 | 10/2010 | Hsieh |
| 2012/0071996 A1 | 3/2012 | Svendsen |
| 2014/0189648 A1 | 7/2014 | Everitt |
| 2015/0142931 A1 | 5/2015 | Dong |
| 2015/0363061 A1 | 12/2015 | De Nigris, III et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability mailed on Apr. 3, 2014, issued in connection with International Application No. PCT/US2012/056467, filed on Sep. 21, 2011, 11 pages.
International Searhing Authority, International Search Report and Written Opinion dated Feb. 28, 2013, issued in connection with International Application No. PCT/US2012/056467, filed on Sep. 21, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated May 5, 2016, issued in connection with U.S. Appl. No. 14/318,148, filed Jun. 27, 2015, 17 pages.
Notice of Allowance dated Mar. 10, 2017, issued in connection with U.S. Appl. No. 14/318,148, filed Jun. 27, 2014, 5 pages.
Notice of Allowance dated Nov. 16, 2016, issued in connection with U.S. Appl. No. 14/318,148, filed Jun. 27, 2014, 7 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

MUSIC STREAMING USING SUPPORTED SERVICES

CROSS REFERENCE TO RELATED APPLICATIONS

This application claims priority under 35 U.S.C. § 120 to, and is a continuation of, U.S. non-provisional patent application Ser. No. 14/318,148, filed on Jun. 27, 2014, entitled "Music Streaming Using Supported Services," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
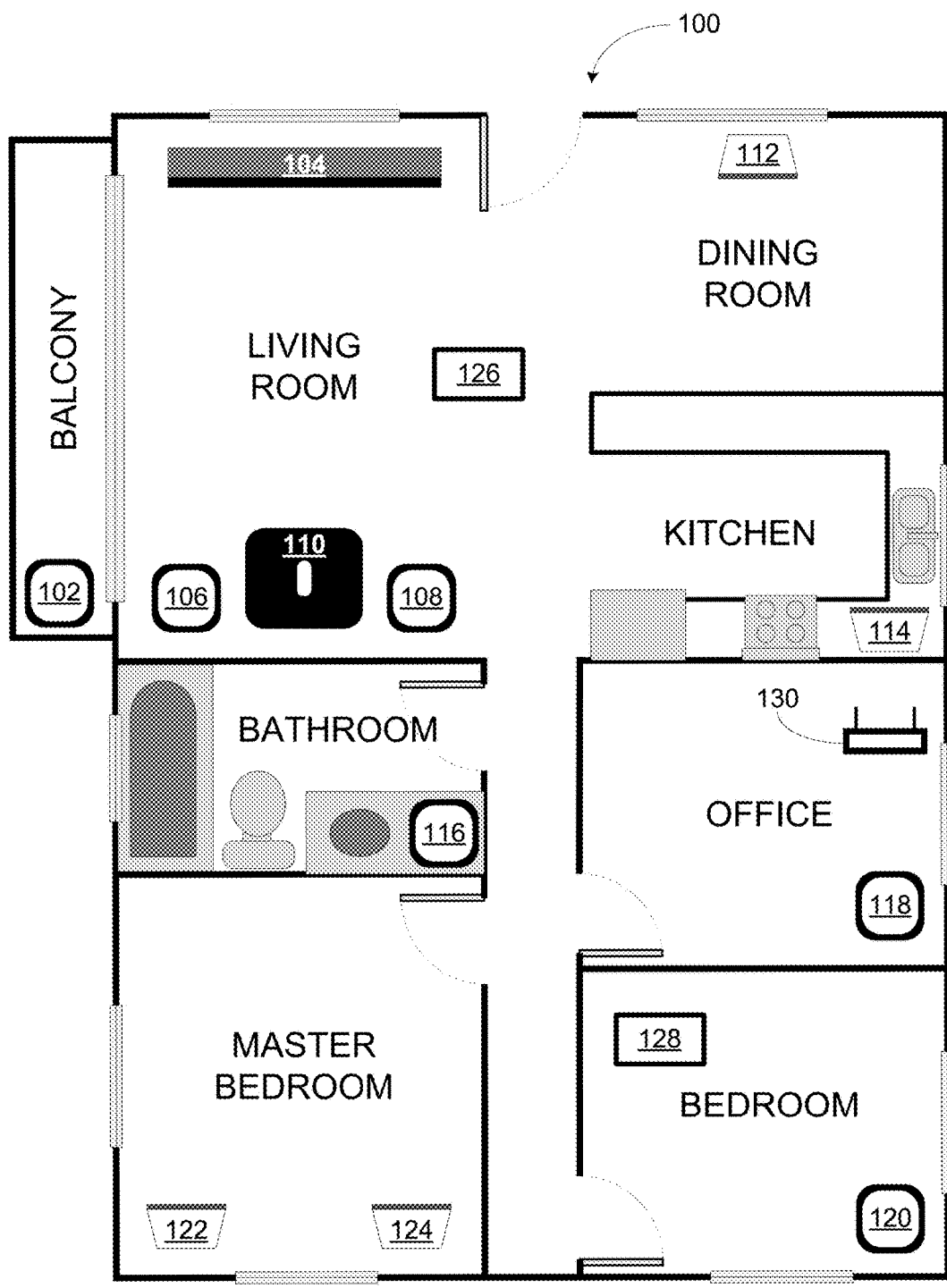
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Media provision services, (e.g., SPOTIFY®, PANDORA®, RHAPSODY®, BEATS™ MUSIC, etc.) may use customized identification systems for identifying music tracks, albums, artists, and other aspects of media items. For example, a media provision service may assign one or more media item identifiers to a media item. The assigned media item identifiers may be different than media item identifiers assigned to the media item by another media provision service. For example, a media item identifier assigned to a media item provided by a first service might be "Service1: track:abcdef0123234," while a media item identifier assigned to the same media item provided by a second service might be "Service2:ft2345049." The term "media item identifier," as used herein, is meant to broadly encompass data that identifies or characterizes any aspect of a media item, including but not limited to track titles, albums, artists, memory locations or addresses, uniform resource identifiers (URIs), uniform resource locators (URLs), service providers, or other aspects of a media item.

Accordingly, when a media provision service provides a media item identifier to a media playback system, the media playback system can later request that the media provision service provide the media item by providing the media item identifier back to the media provision service.

Some services may provide other media related services in addition to media provision services. For instance, media curating services curate media items aggregated from other services (e.g., media provision services). In other words, a media curating service may aggregate media items using media item identifiers unique to the media curating service but not actually provide the media items for playback. Of course, a media provision service may also include media curating services. For example, a media curating service (e.g., BLUE NOTE®, SLACKER®, BEATS MUSIC®) may provide curated media by providing media item identifiers associated with one or more media provision services. In one example, a record label may curate its own media and provide media item identifiers associated with one or more media provision services where the record label's media items are available. In the instance where the media curating service does not provide access to the actual media item, a media playback system accessing the media curating service would be unable to access the actual media item directly from the media curating service. Rather, the media playback system would use the media item identifiers associated media provision services to access the media item.

As such, according to some example implementations described herein, the example methods, systems, and circuitry may facilitate interaction between a media playback system and media services, such as media curating services and media provision services, in a more efficient and/or desirable manner.

Accordingly, some examples described herein involve, among other things, sending from a media playback system a first message to a curating service. The first message may include an indication of a service provider to which the media playback system has access. The media playback system may receive a second message from the curating service that includes a media item identifier. The media playback system may then send a request that includes the media item identifier to the service provider. Other aspects of the examples will be made apparent in the remainder of the description herein.

In one aspect, a non-transitory computer readable memory is provided. The non-transitory computer readable memory has stored thereon instructions executable by a media playback system configured to perform functions. The functions include sending a first message to a curating service. The first message includes an indication of a service provider to which the media playback system has access. The functions further include the media playback system receiving a second message from a curating service. The second message may include a media item identifier. The functions further include the media playback system sending a request to the service provider for a media item. The media item may be identified by a media item identifier.

In one aspect, a method is provided. The method involves receiving a message at a curating service from a media playback system. The message includes a service provider access identifier that indicates the media playback system has access to the service provider. Based on the first message, the curating service determines that the service provider has access to media corresponding to a media item identifier. The curating service then transmits a message to the media playback system that includes the media item identifier.

In another aspect, a non-transitory computer readable memory is provided. The non-transitory computer readable memory has stored thereon instructions executable by a computing device to perform functions. The computing device may, for example, be a server device. The functions include receiving a message from a media playback system that indicates the media playback system has access to a service provider. Based on the message, the computing device determines that the service provider has access to media corresponding to a media item identifier. Then, the computing device transmits a message to the media playback system that includes the media item identifier.

In another aspect, a method is provided. The method involves a media playback system determining one or more service providers are accessible by the media playback system. The method further involves generating a message header that includes an identification of the accessible service providers. The method further includes the media playback system sending a message to a curating service that includes the generated message header.

In another aspect, a method is provided. The method involves a controller application installed on a media playback system storing service-provider identification data that indicates the media playback system has access to a service provider. The method further involves a curator application installed on the media playback device detecting a media item. The method further involves the media playback system determines that the media item is available at the service provider. The method further involves the media playback system sending a request to the service provider for the media item, where the media item is identified by a media item identifier.

In another aspect, a media playback system is provided. The media playback system includes a processor and memory storing instructions that when executed by the media playback system, cause the computing device to perform functions. The functions include sending from a media playback system a first message to a curating service. The first message may include a service provider access identifier that indicates a service provider to which the media playback system has access. The media playback system may receive a second message from the curating service that includes a media item identifier. The media playback device may then send a request that includes the media item identifier to the service provider.

In another aspect, a system is provided. The system includes a first computing device and a second computing device. In one example, the computing devices are server systems. Each computing device includes a processor and memory storing instructions that when executed by the computing device, cause the computing device to perform functions. The functions at the first computing device include receiving a first message from a media playback system that includes an indication of a service provider to which the media playback system has access. The functions at the first computing device further include sending a second message to the media playback system that includes a media item identifier. The functions at the second computing device include receiving a request from the media playback system that includes the media item identifier.

In another aspect, a non-transitory computer readable memory is provided. The non-transitory computer readable memory has stored thereon instructions executable by a computing device to perform functions. The computing device may, for example, be a media playback device. The functions include sending a first message to a curating service that includes an indication of a service provider to which the media playback system has access. The functions further include receiving a second message from the curating service that includes a media item identifier. The functions further include sending a request to the service provider for a media item, where the media item is identified by the media item identifier.

In another aspect, a media playback system is provided. The media playback system includes a processor and memory storing instructions that when executed by the media playback system cause the media playback system to perform functions. The functions include determining a service provider to which the media playback system has access. The functions further include generating a message header that includes an identification of the service provider. The functions further include sending a message from the media playback system to a curating service that includes the message header.

In another aspect, a media playback system is provided. The media playback system includes a processor and memory storing instructions that when executed by the media playback system cause the media playback system to perform functions. The functions include receiving, by a curating application installed on the media playback system, a first message from a second application installed on the media playback system. The first message includes an indication of a service provider to which the media playback system has access. The functions further include receiving, by the curating application, an input. The input includes a media item identifier. The functions further include the media playback system sending a request for a media item to the service provider.

It will be understood by one of ordinary skill in the art that this disclosure includes numerous other embodiments. While some examples described herein may refer to functions performed by given actors such as "users," "media provision services," "curating services," or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
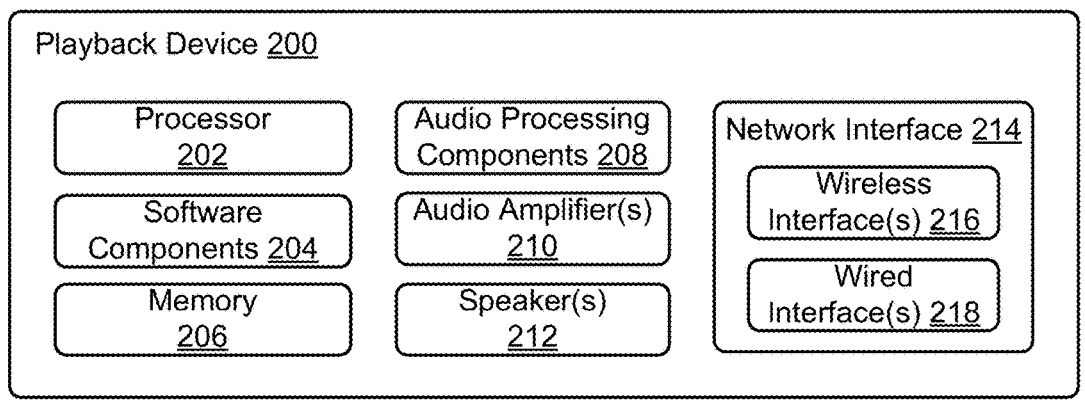
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
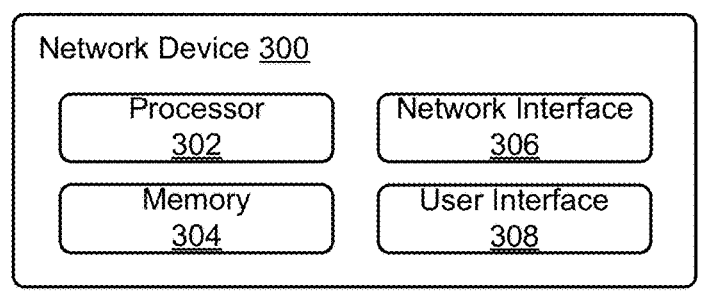
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
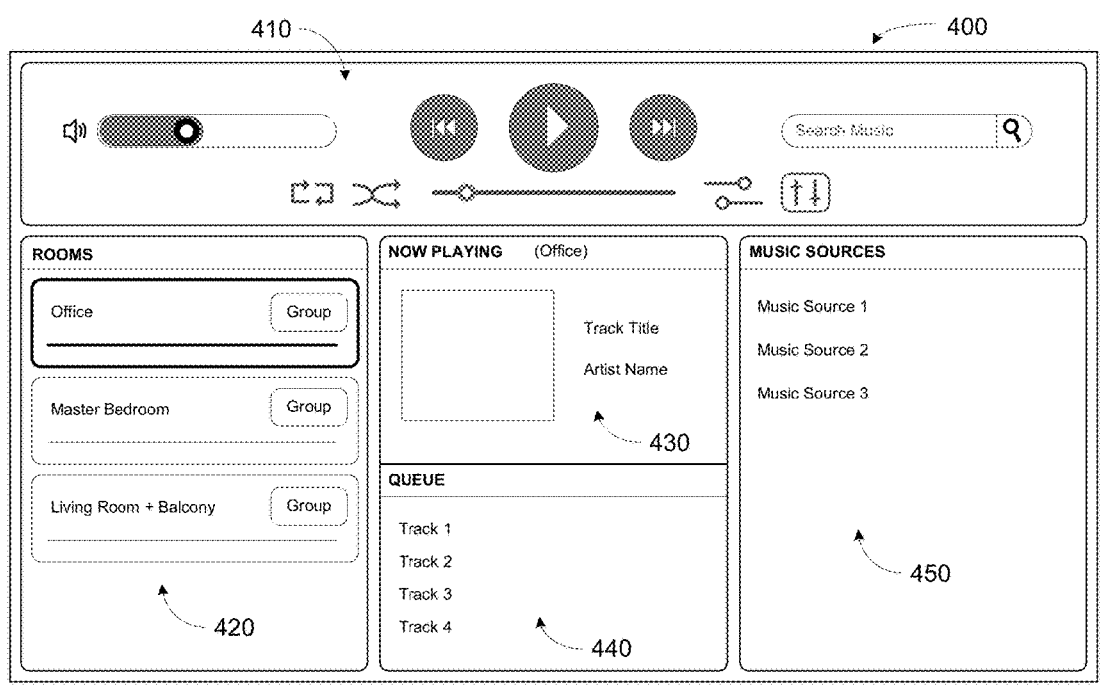
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services (e.g., media provision services) providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible, such as curating services.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods and Systems

As discussed above, some examples described herein may involve, among other things, facilitating interactions between a media playback system and music services such as curating services and media provision services.

In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," "media item identifier," "media provision services," "curating services," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5:
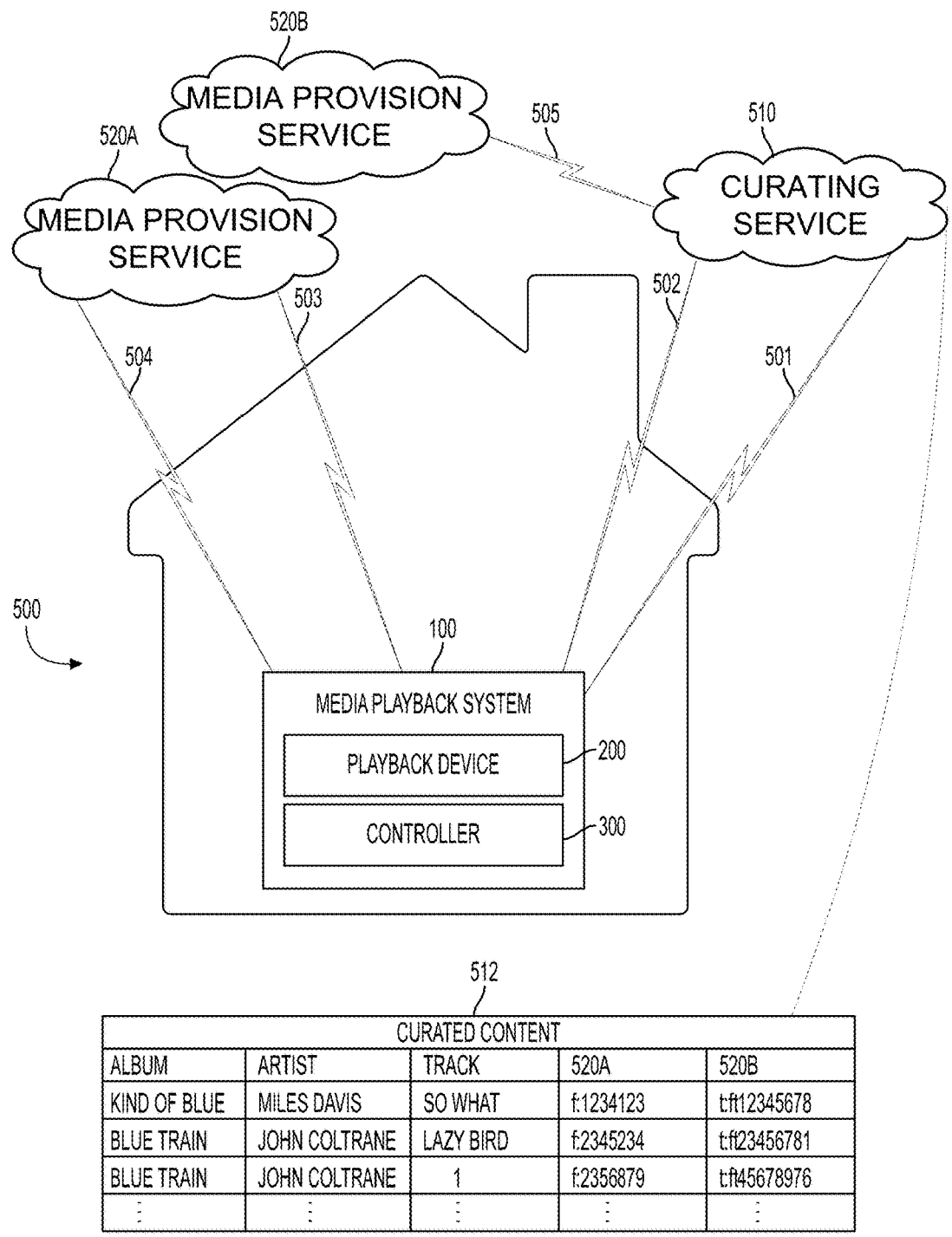
FIG. 5 shows example events and example devices.

FIG. 5 illustrates an example operating environment 500, in accordance with at least some embodiments disclosed herein. Portions of FIG. 5 are referenced below with respect to a description of example methods 600, 700, 800, and 900, and so a brief overview of FIG. 5 is now provided. Certain aspects of FIG. 5 are discussed further below with respect to example methods 600, 700, 800, and 900.

FIG. 5 includes a media playback system 100, a playback device 200, a controller 300, messages 501 and 502, a request 503, a media item 504, a communication link 505, a curating service 510, curated content 512, and media provision services 520A and 520B.

The following description pertaining to FIG. 5 refers to an example operating environment 500, but such an operating environment is disclosed herein for illustrative purposes only and should not be construed as limiting. In other examples, the devices, systems, services, and functions depicted in FIG. 5 may occur or be performed by other devices, systems, services, or functions from those depicted in FIG. 5, or some depicted devices, systems, services or functions may not be performed or occur at all.

The media playback system 100 may send a message, such as message 501, to a computing device of the curating service 510. For example, message 501 may include an indication of a media provision service, such as either of media provision service 520A or media provision service 520B, to which the media playback system 100 has access. For example, as illustrated in FIG. 5, the media playback system 100 may be associated with a user account that is registered with media provision service 520B.

The curating service 510 may have access to curated content 512. The curated content 512, for example, may reside on a database accessible to the media curating service 510. The curated content 512 may include one or more media item identifiers related to various aspects of media items, such as album title, artist name, track title (or number), or a location where a corresponding media item is stored, or other information associated with a media item. The media item identifier may identify one or more aspects of a media item. For example, the media item identifier may identify: a track title, a composer, an album title, a musical genre, a playback duration, a year of release, a performer, a service provider, a URI, a URL, a storage location, or any other aspect associated with the media item, among other examples, or any combination thereof. For example, as illustrated in FIG. 5, the curated content 512 contains information related to media items such as the album name, artist name, track name or number, and identifiers associated with media provision services 520A and 520B. For example, the media item may be stored on a server associated with media provision service 520A as designated by the identifier "f:1234123".

A computing device of the curating service 510 may also send a message, such as message 502, to the media playback system 100. For example, the curating service 510 may determine one or more service specific identifiers of curated content 512 that correspond to the media provision service to which the media playback device has access. Curating service 510 may then send a message, (illustrated in FIG. 5 as message 502) to the media playback system 100. The message 502 may include a media item identifier, such as a track identifier, an album identifier, a location identifier, a media provision service identifier, or other information.

The media playback system 100 may send a request to a media provision service. For example, as illustrated in FIG. 5, the media playback system 100 may send a request 503 to media provision service 520A. The request 503 may include a media item identifier.

The media provision service may provide a media item to the media playback system 100. For example, as illustrated in FIG. 5, the media provision service 520A sends a response 504 that includes a media item based on the media item identifier provided by request 503.

Curating services and provision services may also communicate with each other. For example, as illustrated in FIG. 5, media curating service 510 and media provision service 520B may communicate with each other through communication link 505. For example, media curating service 510 may have curated content 512 and may need to verify the location of media items within the curated content 512 at the media provision service 520B. For example, media curating service 512 may have access to identifiers of curated content 512 such as the song "Stuffy Turkey" by the artist Thelonious Sphere Monk. However, media curating service 510 may need to verify whether media provision service 520B has access to Stuffy Turkey. Thus, a media curating service may use communication links, such as communication link 505, to communicate with various media provision services.

Figure 6:
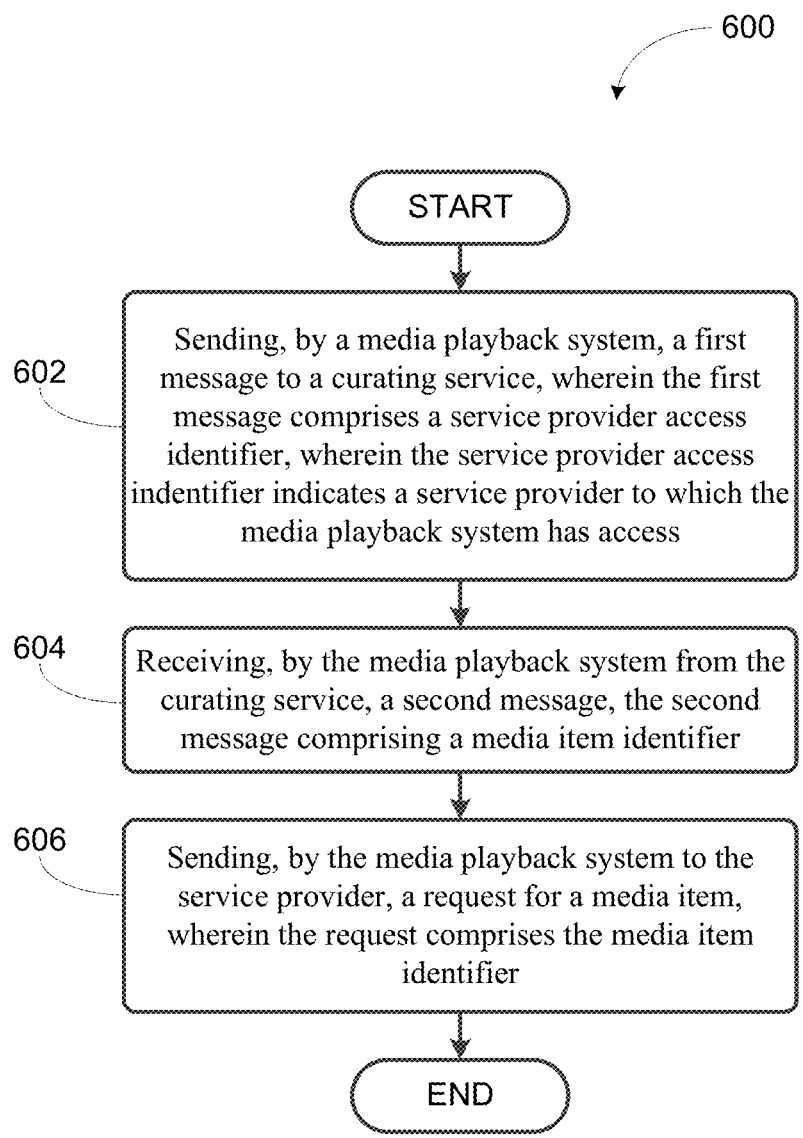
FIG. 6 shows an example flow diagram for an example method.

Method 600 shown in FIG. 6 presents an embodiment of a method that can be implemented within an operating environment involving, for example, the media playback system 100 of FIG. 1, one or more of the playback device 200 of FIG. 2, one or more of the control devices 300 of FIG. 3, and one or more of messages 501 and 502, request 503, media item 504, communication link 505, curating service 510, curated content 512, and media provision services 520A and 520B of FIG. 5. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, the method includes sending, by a media playback system, a first message to a curating service, wherein the first message comprises a service provider access identifier, wherein the service provider access identifier indicates a service provider to which the media playback system has access. As one example, a media playback system 100 may send a first message 501 (shown in FIG. 5) to a computing device of the curating service 510. The first message may include an indication of a service provider to which the media playback system 100 has access. For example, the media playback system 100 may have access to media provision service 520A because the media playback system 100 is associated with a user account of media provision service 520A. . The media playback system 100 may also have access to one or more additional service providers. As such, the message may include an indication that the media playback system 100 has access to those one or more additional service providers. The message may also include one or more media item identifiers.

In a further aspect, the message from the media playback system may not include an indication of an accessible service provider. Rather, the message may include a media item identifier without reference to any accessible service providers. For example, the media playback system may send a request to the curating service for a song title, a genre, or other media item identifiers.

At block 604, the method includes receiving, by the media playback system from the curating service, a second message, the second message comprising a media item identifier. As one example, a media playback system 100 may receive a message 502 from the curating service 510. The message 502 may include one or more media item identifiers. The media item identifier may identify one or more aspects of a media item. For example, the media item identifier may identify: a track title, a composer, an album title, a musical genre, a playback duration, a year of release, a performer, a service provider, a URI, a URL, a storage location, or any other aspect associated with the media item, among other examples, or any combination thereof.

In an example, the media playback system 100 has access to a first media provision service (as indicated from the service provider access identifier of block 602). The message 502 may include a media item identifier corresponding to that first media provision service. Likewise, the message 502 may include a media item identifier corresponding to one or more additional service providers if the media playback system 100 has access to one or more additional service providers.

Messages may be organized in some manner. As one example, if the media playback system 100 has access to multiple service providers, the message 502 may be organized in an order of preference of media item identifiers corresponding to service providers. For example, the message may be organized such that the service providers are ranked in an order of preference. The order of preference may be set by a user, set by the media playback system 100, set by the curating service, set by a combination of these, or by any other method. For example, the user may prefer a first media provision service, then a second media provision, and not have any further preferences. But that media playback system 100 may have a business relationship with a third media provision service. Thus, the media playback system 100 may set the order of preference such that the first, then the second, then the third media provision services are utilized.

At block 606, the method includes sending, by the media playback system to the service provider, a request for a media item, wherein the request comprises the media item identifier. For example, the media playback system 100 may send a request 503 for a media item to the media provision service 520A. The request 503 may include the media item identifier received by the media playback system 100 in block 604. As an example, the media playback system 100 may send a request 503 to a server associated with media provision service 520A.

In an example method, the media playback system 100 may include a playback device 200. Method 600 may further include the media playback system 100 receiving the media item from the server associated with the service provider and effecting playback of the media item at the playback device 200.

In another example method, the media playback system 100 may include a controller 300 and one or more playback devices 200. The controller 300 may receive an input, e.g., from a user of the media playback system 100, that indicates a media item should be sent to one or more of the one or more playback devices 200. For example, the media playback system 100 may send the media item to a stereo pair of playback devices 200 in the living room.

Figure 7:
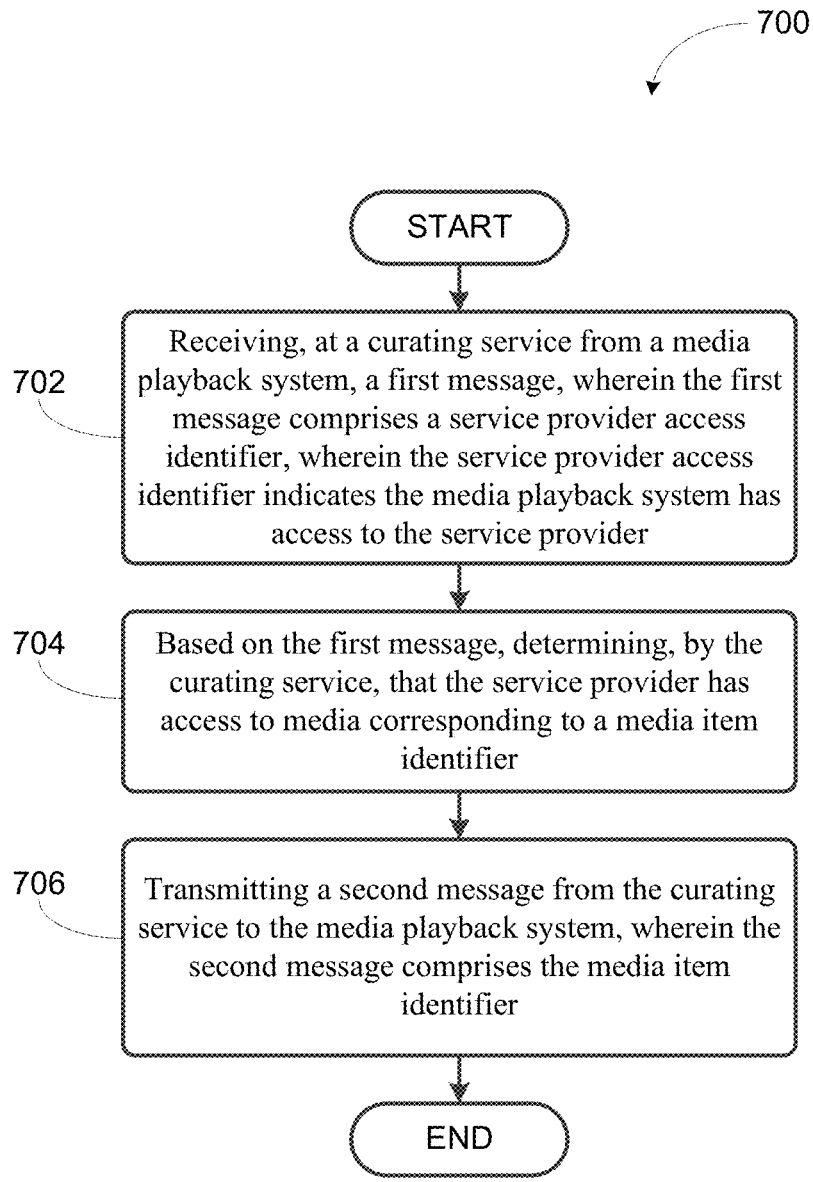
FIG. 7 shows an example flow diagram for an example method.

Method 700 shown in FIG. 7 presents an example method that can be implemented within an operating environment involving, for example, the media playback system 100 of FIG. 1, one or more of the playback device 200 of FIG. 2, one or more of the control device 300 of FIG. 3, and one or more of messages 501 and 502, request 503, media item 504, communication link 505, curating service 510, curated content 512, and media provision services 520A and 520B of FIG. 5. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, the method includes receiving, at a curating service from a media playback system, a first message, wherein the first message comprises a service provider access identifier, wherein the service provider access identifier indicates the media playback system has access to the service provider. In one example, the curating service 510 receives a first message 501 from a media playback system 100. The first message 501 includes an indication that the media playback system 100 has access to one or more service providers. For example, the message 501 may indicate that the media playback device has access to a server associated with a first media provision service 520A and a second media provision service 520B. Additionally or alternatively, the message may include one or more media item identifiers.

At block 704, the method includes, based on the first message, determining, by the curating service, that the service provider has access to media corresponding to a media item identifier. In one example, the curating service 510 determines, based on the first message 501, that the service provider has access to a media item corresponding to a media item identifier. For example, the curating service 510 may have media item identifiers for curated content 512 where the associated media item is available on a server associated with a first media provision service 520A. The curating service 510 may use communication link 505 to verify that media provision service 520A has access to the media item corresponding to a media item identifier.

In another example, the curating service may receive a first message that identifies one or more media item identifiers but does not identify accessible service providers. For example, the first message may include a song title or a genre. The curating service may then determine one or more media provision services which have access to the one or more media item identifiers. As described above in reference to FIGS. 5 and 6, an order of preference may exist for media provision services. For example, the curating service 510 may first determine that a first media provision service 520A has access to a media item associated with the song title from the first message and may then determine that a second media provision service 520B has access to the media item.

At block 706, the method includes transmitting a second message from the curating service to the media playback system, wherein the second message comprises the media item identifier. For example, the curating service 510 may transmit a message 502 to the media playback system 100. The message 502 may include one or more media item identifiers.

Figure 8:
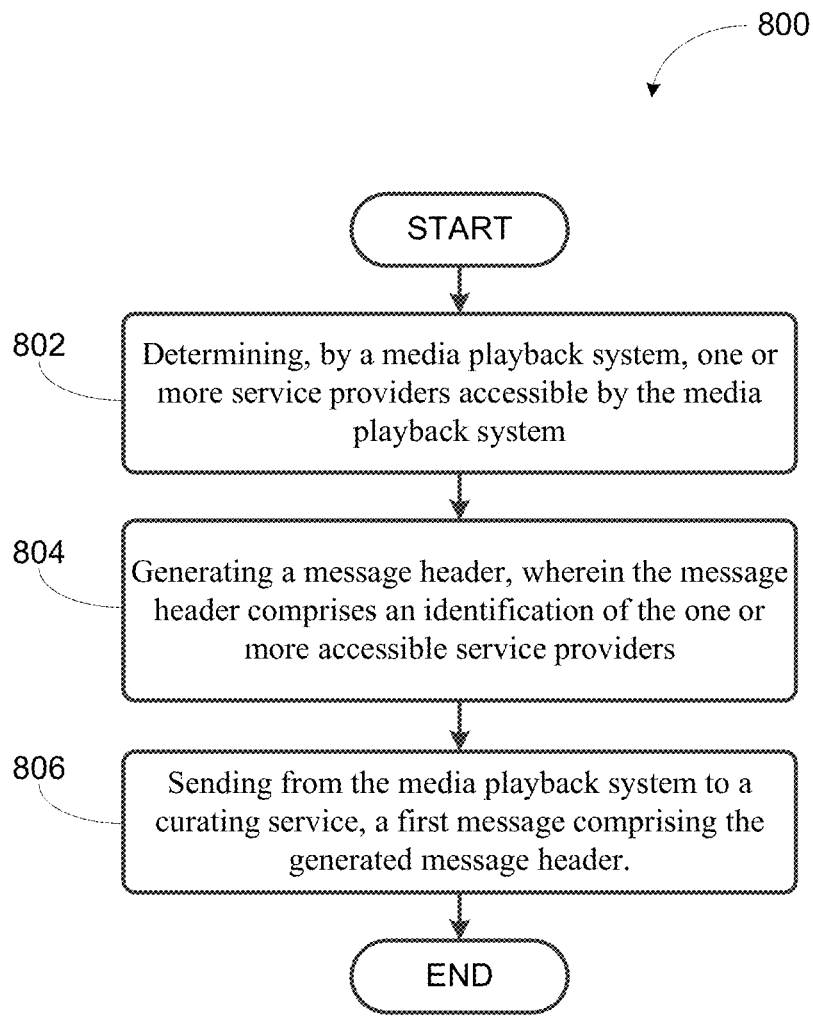
FIG. 8 shows an example flow diagram for an example method.

Method 800 shown in FIG. 8 presents an example method that can be implemented within an operating environment involving, for example, the media playback system 100 of FIG. 1, one or more of the playback device 200 of FIG. 2, one or more of the control device 300 of FIG. 3, and one or more of messages 501 and 502, request 503, media item 504, communication link 505, curating service 510, curated content 512, and media provision services 520A and 520B of FIG. 5. Method 800 may include one or more operations, functions, or actions as illustrated by one or more of blocks 802-806. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, the method includes determining, by a media playback system, one or more service providers accessible by the media playback system. For example, a media playback system 100 may determine one or more service providers accessible by the media playback system 100 by reference to a database accessible to the media playback system 100. In another example, a device, such as controller 300, associated with media playback system 100 may be provided with credentials to access one or more service providers. In yet another example, the media playback system 100 may communicate with one or more service providers to determine whether the media playback system 100 has access to the one or more service providers.

At block 804, the method includes generating a message header, wherein the message header comprises an identification of the one or more accessible service providers. For example, a computing device of the media playback system 100 may generate a message header. The message header may include an identification of the one or more accessible service providers determined at block 802.

At block 806, the method includes sending from the media playback system to a curating service, a first message comprising the generated header. For example, the media playback system 100 may send a first message 501 to a curating service 510. The first message 501 may include the generated message header from block 804.

In some embodiments, method 800 may include the use of an application programming interface, or API, on a computing device of the media playback system 100. With some network transactions, the API may include the message header that tells the curating service 510 which service providers are accessible to the media playback system 100. The message header may be, for example, a list of service provider identifications, a list of numeric identifications (such as 3, 6, and 11) stored in a table that correlates the numeric identifications to a service, or a list of more readable names (such as Service Provider 1, Service Provider 2, Service Provider 3, etc.). The message header may list the service providers in an order of preference. The order of preference may be determined as described above in reference to FIGS. 5, 6, and 7. The order of preference may also be determined by the media playback system 100 based on user input, user profiles, a list of preferred service providers, or any other means. When the media playback system 100 has access to multiple service providers, the media playback system 100 may receive from the curating service one or more media item identifiers from each of the service providers in an order of preference.

In some embodiments, the first message 501 may include one or more media item identifiers. The media item identifier may include identifications of one or more aspects of a media item, such as a track title, a composer, an album title, a musical genre, a playback duration, a year of release, a performer, a service provider, a URI, a URL, a storage location, or any other aspect associated with the media item, among other examples, or any combination thereof.

In one example, the method 800 may further include the media playback system 100 receiving a message, such as message 502, from the curating service in response to the sent message header from block 806. The message may include one or more media item identifiers associated with the one or more accessible service providers. After the media playback system 100 receives the message from the curating service, the method 800 may further include the media playback system 100 sending a request, such as request 503, to the service provider that includes the one or more media item identifiers. After the media playback system 100 sends the request, the method 800 may further include the media playback system 100 receiving one or more media items from the service provider and effecting playback at one or more playback devices, such as playback device 200. In one example, the media playback system 100 may effect playback at specific playback devices. For example, a user may indicate on a controller 300 to playback the one or more media items obtained from the service provider at a stereo pair of playback devices 300 in the kitchen.

Figure 9:
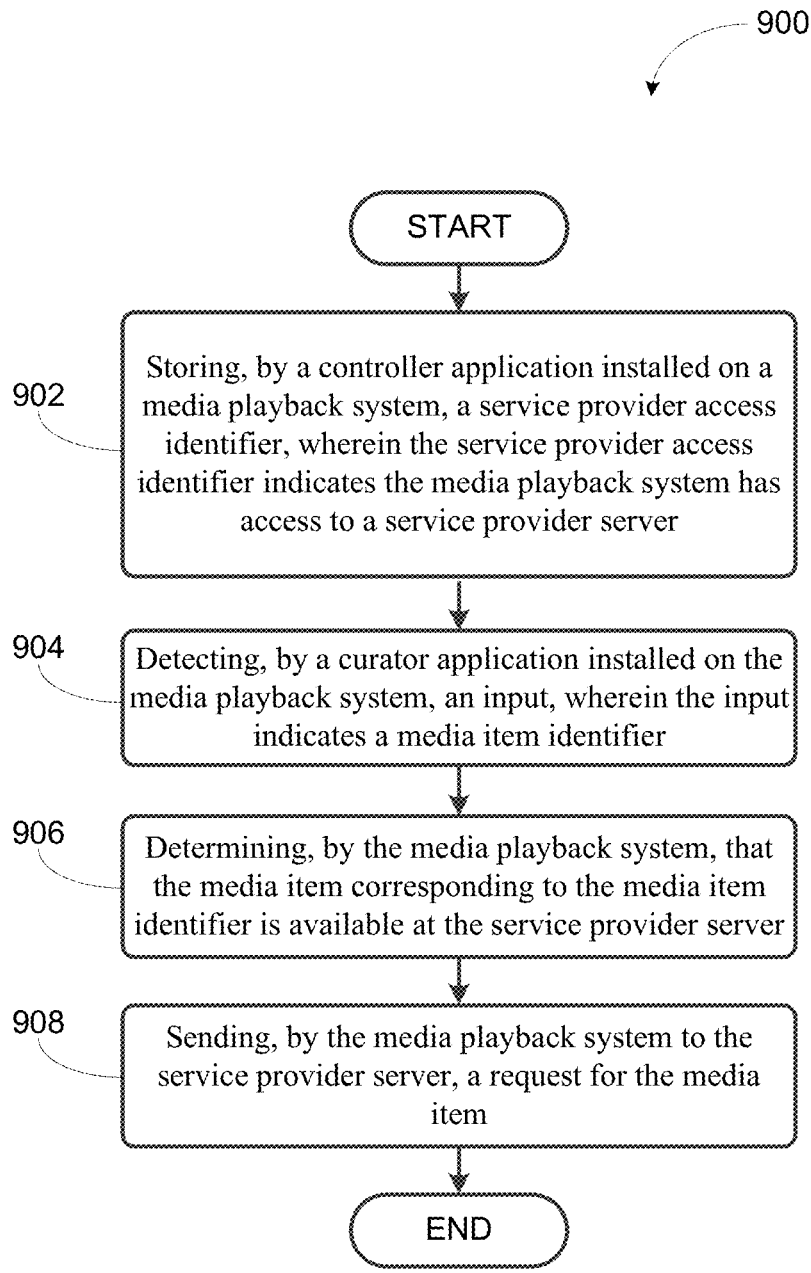
FIG. 9 shows an example flow diagram for an example method.

Method 900 shown in FIG. 9 presents an example method that can be implemented within an operating environment involving, for example, the media playback system 100 of FIG. 1, one or more of the playback device 200 of FIG. 2, one or more of the control device 300 of FIG. 3, and one or more of messages 501 and 502, request 503, media item 504, communication link 505, curating service 510, curated content 512, and media provision services 520A and 520B of FIG. 5. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 9 may represent circuitry that is wired to perform the specific logical functions in the process.

At block 902, the method 900 includes storing, by a controller application installed on the media playback system, a service provider access identifier, wherein the service provider access identifier indicates the media playback system has access to a service provider server. For example, at block 902 the media playback system 100 may execute code representing a controller application which causes storage of a service provider access identifier on the media playback system 100. The service provider access identifier may indicate the media playback system 100 has access to the service provider. In some embodiments, one or more additional service provider access identifiers may be stored as well.

At block 904 the method 900 includes detecting, by a curator application installed on the media playback system, an input, wherein the input indicates a media item identifier. For example, an input may be detected by a curator application installed on the media playback system 100 that indicates one or more media item identifiers. For example, a user of the media playback system 100 may run a curator application and then indicate he or she would like to hear a certain genre of songs, for example, by a touch input on a touchscreen device on a controller 300. The media playback system 100 may detect an input based on entered text and a subsequent search, a provided list, a voice command, motion detection, or other methods.

At block 906, the method 900 includes determining, by the media playback system, that the media item corresponding to the media item identifier is available at the service provider server. The method 900 may further include determining whether one or more additional media items corresponding to one or more media item identifiers are available from one or more service providers at one or more service provider servers. For example, the media playback system 100 may determine that the media item corresponding to the media item identifier is available at the service provider by, for example, reference to a database on a server of the service provider.

At block 908, the method 900 includes sending, by the media playback system to the service provider server, a request for the media item. For example, the media playback system 100 may send a request, such as request 503, for the media item to the service provider.

In one example, the method 900 may further include the media playback system 100 receiving one or more media items from the service provider and effecting playback at the one or more playback devices 200. The media playback system 100 may also effect playback at specific playback devices 200. For example, a user may indicate via a controller 300 to playback the one or more media items obtained from the service provider at a stereo pair of playback devices (e.g., playback devices 106 and 108 in the Living Room of FIG. 1).

In a further embodiment, the media playback system 100 may use application launching to facilitate interactions between curating services and media provision services. Application launching refers to the practice of an operating system supporting the ability for applications to register a URL scheme with the operating system. After registration, the operating system will handle a registered URL by automatically launching the registered application. For example, a music service focused on music criticism and commentary, music news, and artist interview (e.g., Pitchfork® Media) may create an application. In this example, the application is a third party application but the application does not have to be a third party application. Similar to other curating services, the music service may aggregate and curate content and may have access to media item identifiers without having access to the media item itself. The music service could integrate with the media playback system 100 by launching its application on a computing device associated with the media playback system 100, such as controller 300, using a URL scheme, such as:

"Service1://whats_new?x-callback-url=sonos://play-song&sonosSvcs=ServiceApp1".

After launching an application, the media playback system 100 may communicate with the application that the media playback system has access to one or more accessible service providers. In one example, the application may be able to control media playback on the local computing device, such as the controller 300. For example, if the controller is a smart phone, the application may be able to effect playback of the media item on the smart phone. In a further example, the application may even be able to effect playback at the media playback system 100 on one or more playback devices, such as playback device 200. For example, the application may contain programming that allows it to effect playback at the media playback system 100 directly from the launched application.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A computing device of a media curating service comprising:
   one or more processors;
   tangible, non-transitory computer-readable memory having stored thereon instructions that, when executed by the one or more processors, cause the computing device to perform functions comprising:
   storing media item identifiers of curated media items associated with one or more service providers, wherein the media curating service aggregates the media item identifiers of curated media items, and wherein the curated media items corresponding to the media item identifiers are stored in a service provider server of a given service provider;
   receiving, from a media playback system, a first message comprising a service provider access identifier, wherein the service provider access identifier is based on a user account of the media playback system registered to at least one service provider;
   based on receiving the first message, determining media item identifiers of curated media items that are associated with the at least one service provider with which the user account of the media playback system is registered; and
   causing the media playback system to play back the curated media items based on the determined media item identifiers of the curated media items.

2. The computing device of claim 1, wherein the first message further comprises a request for curated media items; and wherein the functions further comprise:
   prior to determining media item identifiers of curated media items, identifying the curated media items based on the request.

3. The computing device of claim 1, wherein causing the media playback system to play back the curated media items comprises:
   transmitting, to the media playback system, a second message comprising the media item identifiers of curated media items associated with the at least one service provider with which the user account of the media playback system is registered.

4. The computing device of claim 1, wherein the media item identifier of a given curated media item comprises a universal resource location of the given curated media item on the service provider server.

5. The computing device of claim 1, wherein the first message further comprises a media item identifier, and wherein the functions further comprise:
   identifying the at least one service provider based on the media item identifier.

6. The computing device of claim 1, wherein the first message further comprises a media item identifier, and wherein the functions further comprise:
   prior to determining media item identifiers of curated media items, identifying the curated media items based on the media item identifier in the first message.

7. The computing device of claim 1, wherein receiving from a media playback system, a first message comprises:
   receiving, from a curator application installed on a control device of the media playback system, the first message.

8. The computing device of claim 1, wherein the media item identifiers of curated media items comprise (i) a track identifier and (ii) a service provider identifier.

9. The computing device of claim 8, wherein the track identifier and the service provider access identifier are associated with at least one service provider.

10. A computing device comprising:
    one or more processors;
    tangible, non-transitory computer-readable memory having stored thereon instructions that, when executed by the one or more processors, cause the computing device to perform functions comprising:
    receiving indications of: (i) media item identifiers of curated media items for a media curating service that are associated with at least one service provider with which a user account of a media playback system is registered, (ii) a request for media items associated with the media item identifiers of curated media items, and (iii) a media playback system; and sending, to the media playback system, the media items associated with the media item identifiers of curated media items that are associated with the at least one service provider with which the user account of the media playback system is registered, thereby causing the media playback system to play back one or more media items associated with the media item identifiers of curated media items.

11. The computing device of claim 10, wherein receiving the indication of the media playback system comprises receiving the request for media items from the media playback system.

12. The computing device of claim 10, wherein the functions further comprise:

prior to receiving the indications of (i) media item identifiers and (ii) the request for media items associated with the media item identifiers, receiving a request for curated content; and in response to the request for curated content, transmitting, to the media curating service, a request for the media item identifiers.

13. The computing device of claim 10, wherein the request for curated content comprises a media item identifier corresponding to a given media item associated with the at least one service provider, and wherein the curated media items are determined based on the given media item.

14. The computing device of claim 10, wherein the computing device is a service provider server for the at least one service provider.

15. The computing device or claim 10, wherein receiving the indications comprises receiving the indications from a curator application installed on a control device of the media playback system.

16. Tangible, non-transitory computer-readable memory having stored thereon instructions that, when executed by one or more processors of a computing device, cause the computing device to perform functions comprising:

receiving indications of: (i) media item identifiers of curated media items for a media curating service that are associated with at least one service provider with which a user account of a media playback system is registered, (ii) a request for media items associated with the media item identifiers of curated media items, and (iii) a media playback system; and sending to the media playback system, the media items associated with the media item identifiers of curated media items that are associated with the at least one service provider with which the user account of the media playback system is registered, thereby causing the media playback system to play back one or more media items associated with the media item identifiers of curated media items.

17. The tangible, non-transitory computer-readable memory of claim 16, wherein receiving the indication of the media playback system comprises receiving the request for media items from the media playback system.

18. The tangible, non-transitory computer-readable memory of claim 16, wherein the functions further comprise:

prior to receiving the indications of (i) media item identifiers and (ii) the request for media items associated with the media item identifiers, receiving a request for curated content; and in response to the request for curated content, transmitting, to the media curating service, a request for the media item identifiers.

19. The tangible, non-transitory computer-readable memory of claim 16, wherein the request for curated content comprises a media item identifier corresponding to a given media item associated with the at least one service provider, and wherein the curated media items are determined based on the given media item.

20. The tangible, non-transitory computer-readable memory of claim 16, wherein the computing device is a service provider server for the at least one service provider.

\* \* \* \* \*